:::

United States Patent
Cole et al.

(10) Patent No.: US 6,597,794 B2
(45) Date of Patent: Jul. 22, 2003

(54) PORTABLE ELECTRONIC DEVICE HAVING AN EXTERNAL SPEAKER CHAMBER

(75) Inventors: James R Cole, Albany, OR (US); Andrew L Van Brocklin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 178 days.

(21) Appl. No.: 09/767,494

(22) Filed: Jan. 23, 2001

(65) Prior Publication Data

US 2002/0099891 A1 Jul. 25, 2002

(51) Int. Cl.[7] .............................. H04R 1/02; H04R 5/02
(52) U.S. Cl. ...................... 381/333; 381/388; 381/306; 381/340
(58) Field of Search ................................. 381/333, 300, 381/301, 302, 304, 334, 335, 336, 386, 387, 388, 340, 345, 306; 181/182, 177, 179, 196, 198; 361/680–686

(56) References Cited

U.S. PATENT DOCUMENTS

| | | | |
|---|---|---|---|
| 5,610,992 A | 3/1997 | Hickman | 381/188 |
| 5,668,882 A | 9/1997 | Hickman et al. | 381/24 |
| 5,805,708 A | 9/1998 | Freadman | 381/159 |
| 5,847,922 A | 12/1998 | Smith et al. | 361/685 |
| 5,917,695 A | 6/1999 | Youn | 361/683 |
| 6,081,421 A | * 6/2000 | Markow et al. | 381/333 |

* cited by examiner

Primary Examiner—Rexford Barnie
(74) Attorney, Agent, or Firm—Donald J. Coulman

(57) ABSTRACT

A portable electronic device, such as a portable notebook computer, that includes a case made up of a top portion and a bottom portion with a base surface. The case contains a speaker having a front portion and a back portion, where the back chamber is formed in association with the back portion of the speaker. A first aperture is disposed through the bottom portion of the case, and an acoustic insulator is attached to the base surface of the case such that the acoustic insulator encircles the first aperture forming an external chamber. The external chamber is defined by the base surface, and the acoustic insulator being adapted to rest upon a support surface upon which the portable electronic device rests. The external chamber is coupled to the back chamber by the first aperture.

20 Claims, 10 Drawing Sheets

US 6,597,794 B2

PORTABLE ELECTRONIC DEVICE HAVING AN EXTERNAL SPEAKER CHAMBER

BACKGROUND OF THE INVENTION

This invention relates generally to portable electronic devices having one or more speakers for emitting audible sound. More particularly, the present invention relates to a portable electronic device having a speaker configuration that includes an external acoustic chamber.

Portable electronic devices have decreased both in size and weight over the past few years and are becoming ever more popular with travelers. This demand for smaller size with ever-increasing capability has required a tremendous effort to continually shrink many of the components contained within the device. For a notebook computer, examples of component shrinkage are the hard disk storage, the circuitry, tracking devices, Compact Disc drives, speakers, and even the connectors. The reduction in the size of many of these components has not been a serious problem, since technological advancements have allowed both improved capabilities along with smaller size. However, with the ever-increasing use of more sophisticated audio-visual multimedia applications, the reduction in the size of the speaker has caused more severe problems. As the speaker is reduced in size, the maximum power the speaker can handle is also reduced, resulting in both a reduction in loudness as well as a poorer overall quality of sound.

Portable electronic devices being designed today require the ability to operate with multi-media features and provide the user with the same enjoyable experience as that experienced from conventional high quality desktop systems. Thus, the sound emanating from a portable electronic device should provide as full a harmonic content as the original sound without increasing the device size. Thus, increasing the device size to accommodate larger speakers and larger speaker-box sizes is very undesirable since it would strongly detract from the very characteristics that have helped to make these devices popular, namely size and weight. Most audio equipment produces sound between 20 Hz to 20 kHz resulting in a full rich sound quality the average user has come to expect. On the other hand, most portable electronic devices have very limited capability in producing sound below 150 Hz. This limitation is the result of several competing factors. The production of low frequency sound requires the movement of a large mass of air to be heard. Thus the size of both the speaker and speaker enclosure are at odds with the small size of the typical case used in portable electronic devices. This is further limited by the human ear's weak response to low frequency sound thus requiring more power to create the equivalent loudness when compared to sound at 200 Hz and above. Thus, we are left with two serious problems: first is the ability to use a sufficient volume/mass of air to be heard; second is the ability to design speaker enclosures that allow use of more power to increase loudness, both without increasing the size of the case to any appreciable extent.

SUMMARY OF THE INVENTION

A portable electronic device, such as a portable notebook computer, that includes a case made up of a top portion and a bottom portion with a base surface. The case contains a speaker having a front portion and a back portion, where the back chamber is formed in association with the back portion of the speaker. A first aperture is disposed through the bottom portion of the case, and an acoustic insulator is attached to the base surface of the case such that the acoustic insulator encircles the first aperture forming an external chamber. The external chamber is defined by the base surface, and the acoustic insulator being adapted to rest upon a support surface upon which the portable electronic device rests. The external chamber is coupled to the back chamber by the first aperture.

DETAILED DESCRIPTION OF THE PREFERRED EMBODIMENT

Figure 1:
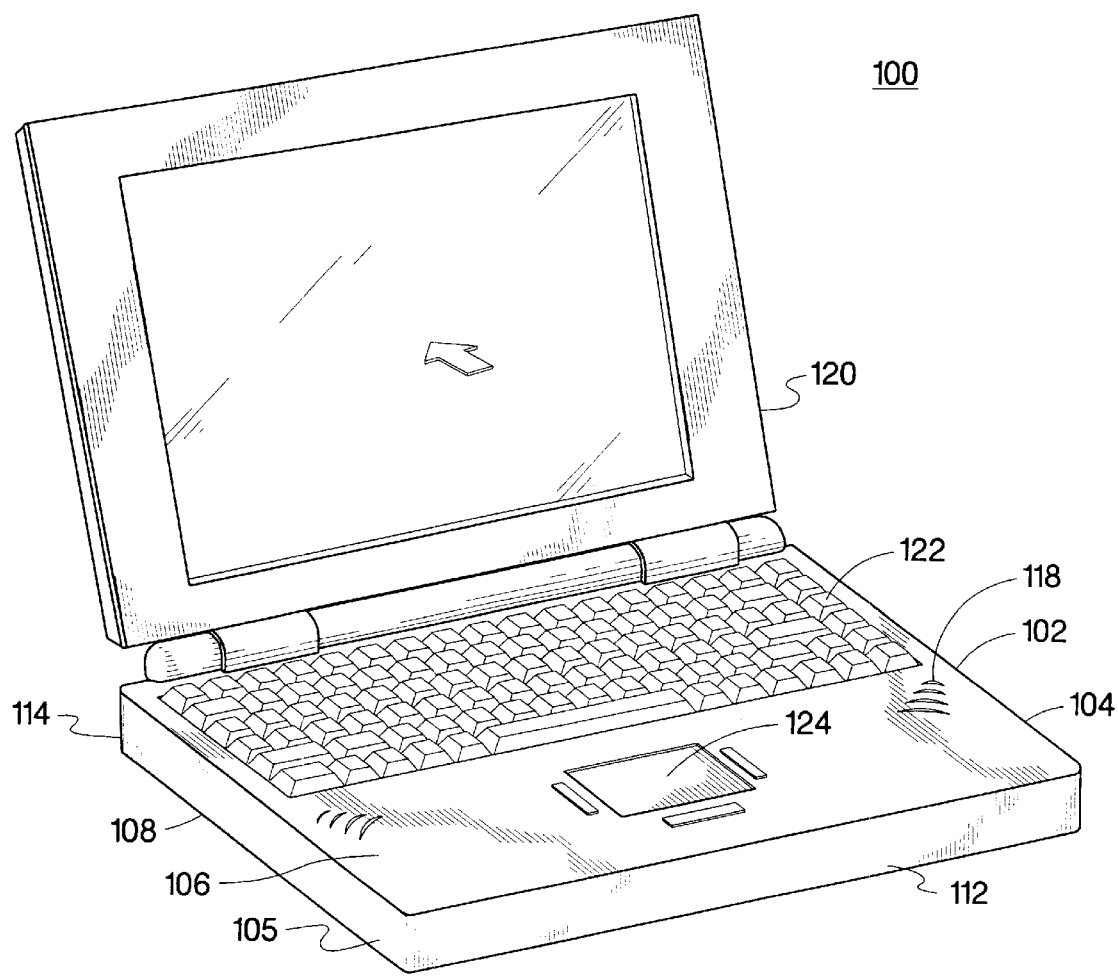
FIG. 1 is a perspective view of a portable electronic device according to an embodiment of this invention.

FIG. 1 shows portable electronic device 100 according to an embodiment of this invention. In this embodiment portable electronic device 100 is a notebook computer. Portable electronic device 100 includes display screen 120 hinged to case 102. Case 102 is divided into top portion 106 and bottom portion 108 and four sides designated as front side 112, back side 114, left side 105 and right side 104. Keyboard 122, pointing device 124 as well as speaker grill 118 are all located in top portion 106. Audio control and audio adjustment are facilitated either manually by a key on keyboard 122 or via software utilizing display screen 120 or both. A main processor board (not shown) is also located inside case 102. In addition, one or more PC cards (also not shown) conforming to the Personal Computer Memory Card International Association standards are included in various embodiments of this invention, an example would be a multimedia applications sound card. Although the preferred embodiment of the present invention is shown as a notebook computer, those skilled in the art will appreciate that the present invention can be utilized in many portable electronic devices such as laptop, handheld and palm top electronic devices as well as in portable compact disc players, portable digital video disk players, cellular telephones and portable radios.

Figure 2:
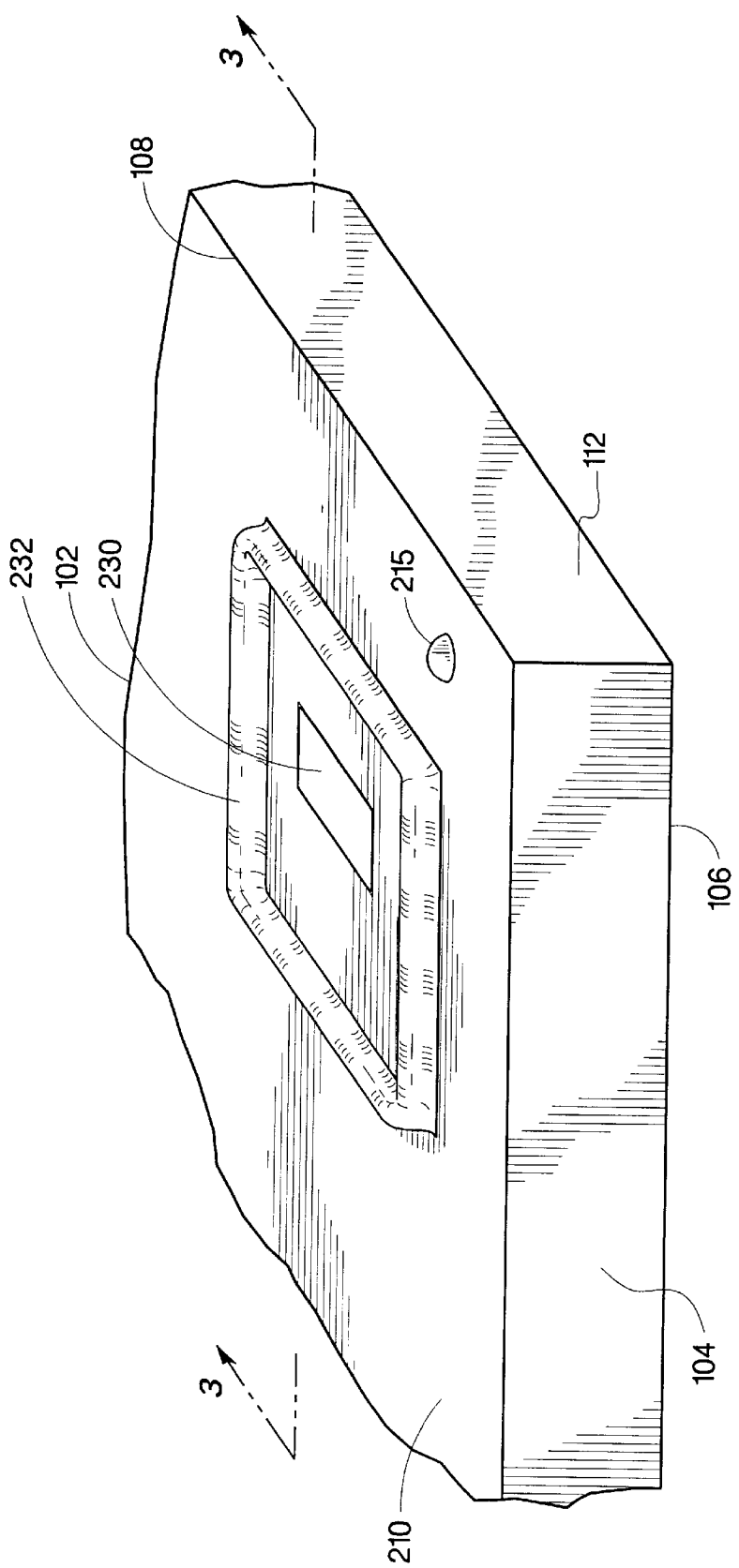
FIG. 2 is an expanded isometric view of a portable electronic device according to an embodiment of this invention.

FIG. 2 shows an expanded isometric view of bottom portion 108 of case 102. Footing 215 (other three not shown) is attached to base surface 210 of case 102 and typically ranges from one to five mm in height but can be a lesser or greater height according to the specific needs of the particular application. First aperture 230 is disposed through bottom portion 108. In this embodiment, acoustic insulator 232 encircles first aperture 230. Acoustic insulator 232 is preferably made of a thermoplastic elastomer such as that manufactured under the trademark Santoprene, by Advanced Elastomer Systems. However, those skilled in the art will appreciate that other materials such as polychloroprene rubbers, chlorosulfonated polyethylene rubber, elastomeric terpolymers of Ethylene-Propylene-Diene Monomers (commonly referred to as EPDM), and others can also be utilized.

Figure 3:
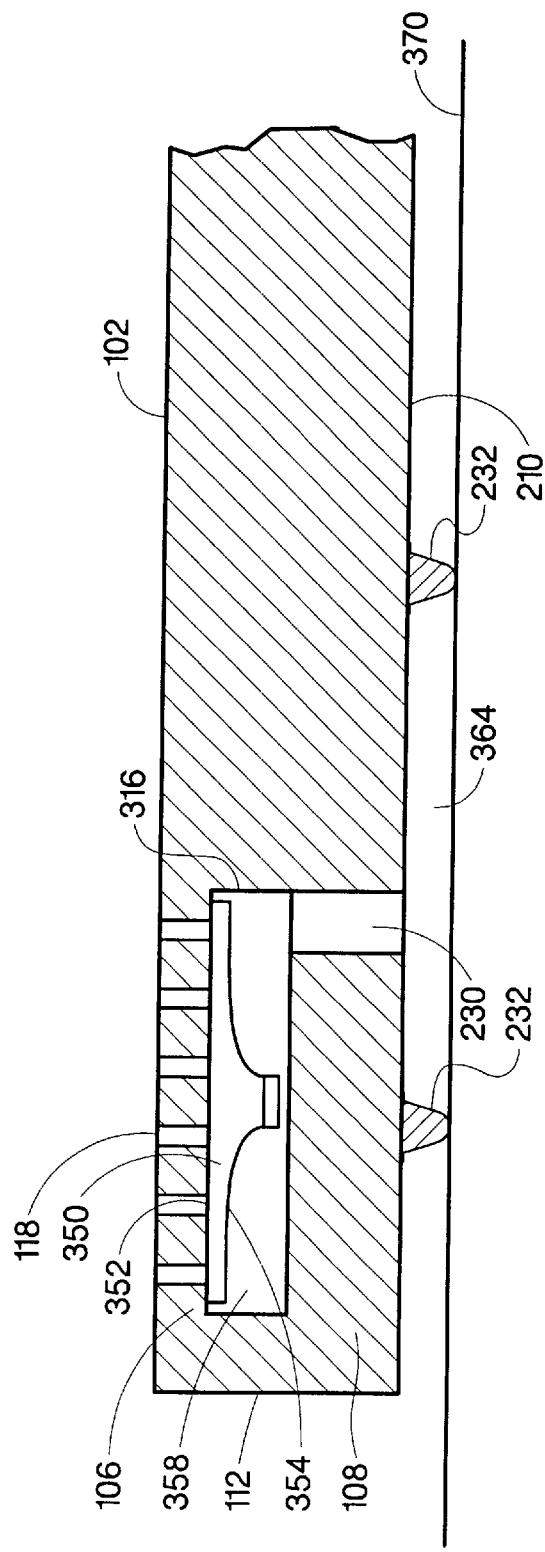
FIG. 3 is a cross-sectional view of a portable electronic device according to the embodiment of this invention shown in FIG. 2.

FIG. 3 shows a cross-sectional view of case 102 showing speaker 350 mounted to the bottom surface of top portion 106. Speaker grill 118 is located directly above speaker 350 and consists of a plurality of openings formed in top portion 106. Speaker 350 is oriented to project sound through speaker grill 118. In this embodiment, the air volume between back portion 354, back wall 316, side walls (not shown) and the interior surfaces of top portion 106, base portion 108, and front side 112, serves as back chamber 358.

In most portable electronic devices, space within the case is severely limited. Thus, typically there is little air volume behind the speaker for a chamber. An advantage of the embodiment of the present invention as shown in FIG. 2 is the ability to utilize a portion of the volume of air which is external to case 102 as additional volume for back chamber 358. This additional external volume is located between portable electronic device 100 and support surface 370, on which portable electronic device 100 resides. Thus, the air volume located between base surface 210 and support surface 370, bounded by acoustic insulator 232, serves as external chamber 364. In this embodiment external chamber 364 and back chamber 358 are acoustically coupled through first aperture 230 forming a much larger volume acoustic chamber without utilizing additional space within case 102. Since sound from back portion 354 is trapped in back chamber 358 and external chamber 364 of speaker 350, the sound from back portion 354 cannot cancel out low frequency sounds coming from front portion 352 of speaker 350. Therefore, in this embodiment, speaker 350 is considered to be in a sealed enclosure, with the air in back chamber 358 and external chamber 364 acting as an acoustic spring in an air suspension system. The sealed enclosure improves the low frequency sound heard by the user. An advantage of the present invention is the achievement of improved sound quality without enlarging the size of portable electronic device 100.

Figure 4:
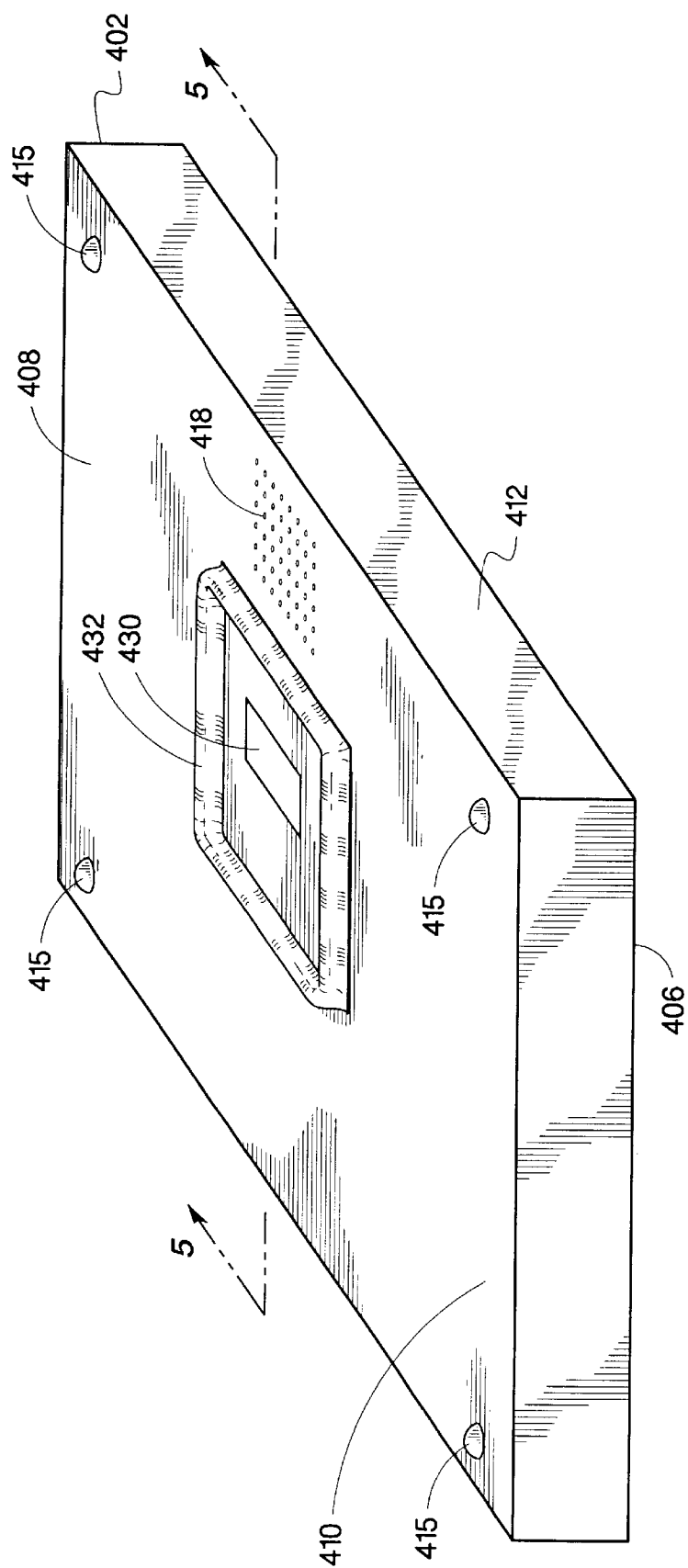
FIG. 4 is an isometric view of a portable electronic device according to an embodiment of this invention.
Figure 5:
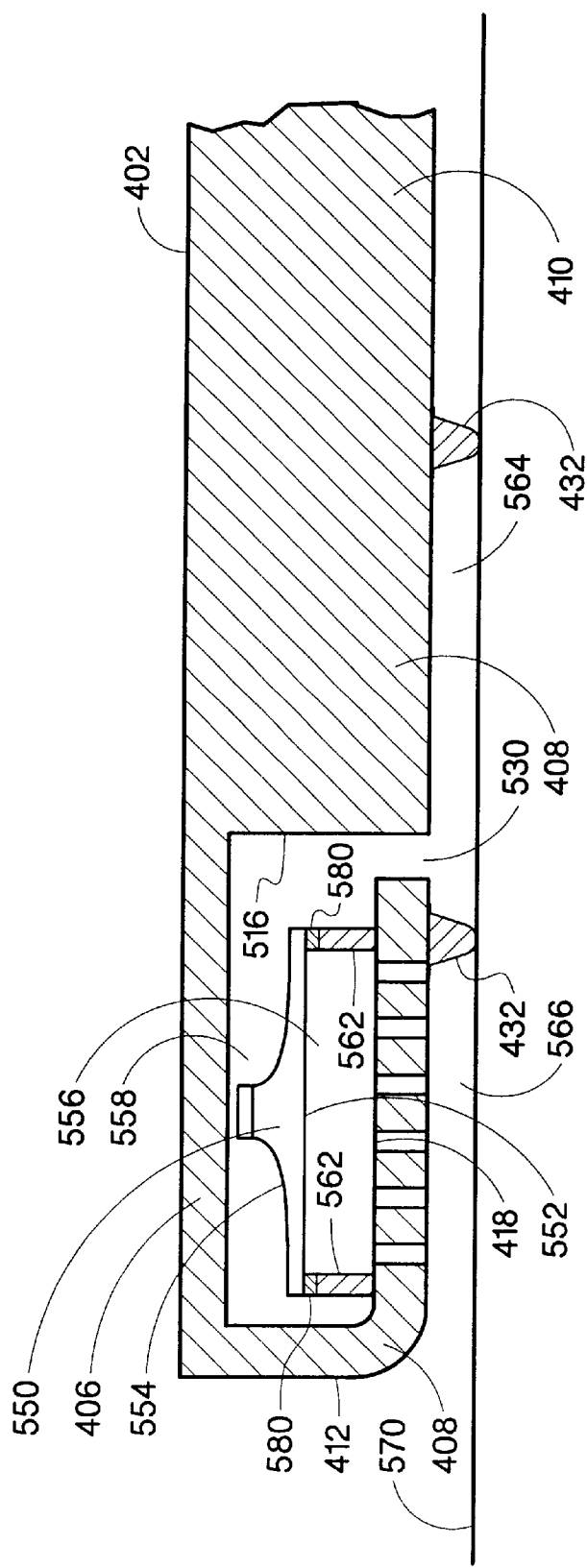
FIG. 5 is a cross-sectional view of a portable electronic device according to the embodiment of this invention shown in FIG. 4.

Referring to FIGS. 4 and 5, an alternate embodiment of the present invention is shown. FIG. 4 is an isometric view of bottom portion 408 of case 402. Footings 415 are attached to base surface 410 of case 402 and typically range from one to five mm in height but can be a lesser or greater height according to the specific needs of the particular application. Speaker grill 418 consists of a plurality of openings formed in bottom portion 408 and first aperture 430 is disposed through bottom portion 408. In this embodiment, acoustic insulator 432 encircles aperture 430.

FIG. 5 shows a cross-sectional view of case 402 showing speaker 550 mounted to speaker support 562 through foam seal 580. Speaker support 562 encircles speaker 550. Those skilled in the art will readily recognize that numerous soft elastomeric materials can be used as a foam seal, such as seals manufactured by Boyd Rubber Corp. of Portland Oreg. Other materials could also be used. Speaker grill 418 is located below speaker 550. Speaker 550 is oriented to project sound through speaker grill 418 toward any underlying generally flat support surface 570 upon which portable electronic device 100 typically resides, such as a table or desk top. The foam seal 580 acoustically decouples out of phase sound waves from front portion 552 and back portion 554. In addition, in order for portable electronic device 100 to rest firmly on support surface 570, typically footings 415 and acoustic insulator 432 are approximately of the same height.

In this embodiment, the air volume located between front portion 552 and speaker grill 418 and bounded by wall 562 and foam seal 580 serves as front chamber 556. The air volume between top portion 406, back portion 554, front side 412, side walls (not shown), and back wall 416 serves as back chamber 558. An advantage of this embodiment is the ability to utilize a portion of the volume of air as additional volume for back chamber 558 which is external to case 402 as well as utilize an additional portion for front chamber 556. The air volume located between base surface 410 and support surface 570 bounded by acoustic insulator 432 serves as external chamber 564. External chamber 564 and back chamber 558 are acoustically coupled through first aperture 430 forming a much larger volume acoustic chamber. The air volume located between base surface 410 and support surface 570 not bounded by acoustic insulator 432 serves as sound chamber 566. Thus, back chamber 558 and external chamber 564 serve as an acoustic high pass structure. Front chamber 556 and sound chamber 566 serve as an acoustic low pass structure extending the lower bound frequency range creating in effect a dual chamber vented/sealed band pass system. Using the external volume of air, located between portable electronic device 100 and support surface 570 on which portable electronic device rests, and the two dimensional configuration of acoustic insulator 432 allows one to tune for the optimum sound from speaker 550.

Figure 6:
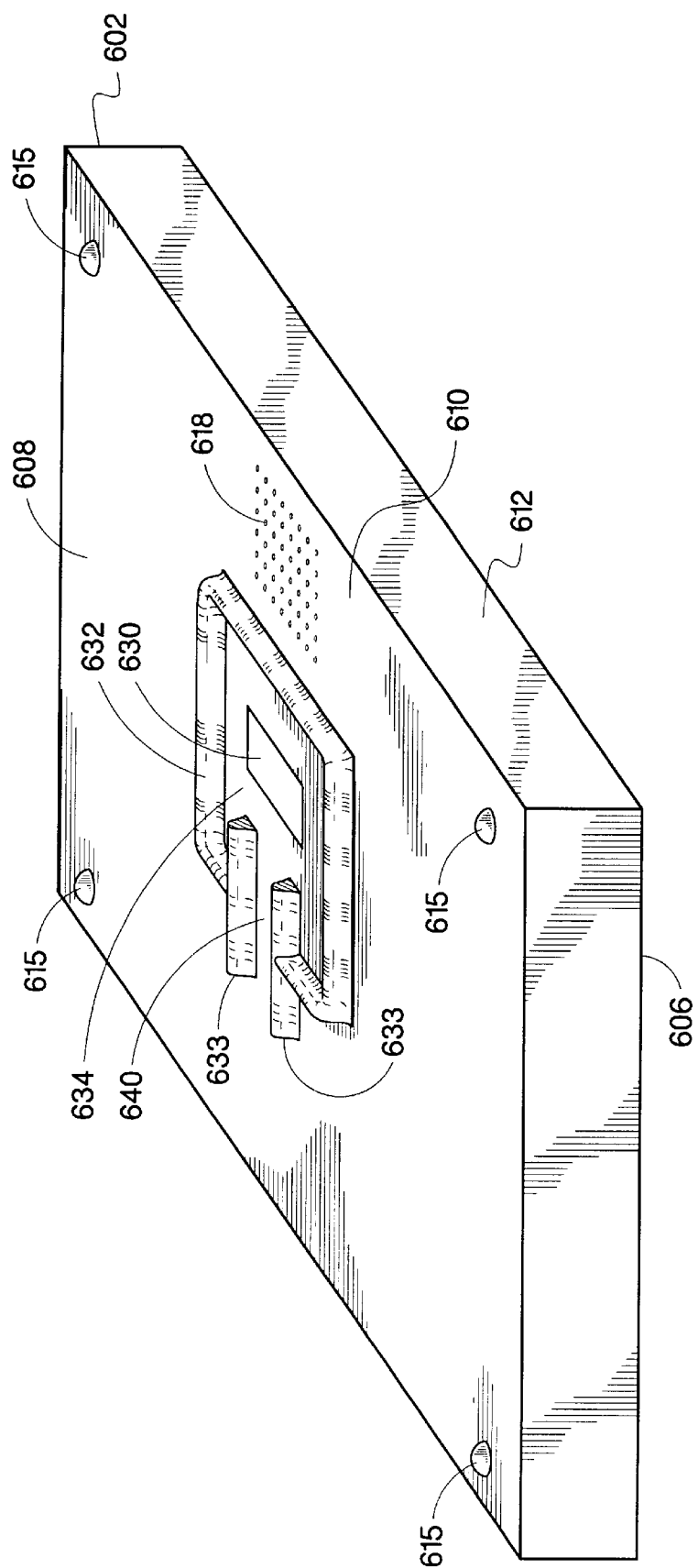
FIG. 6 is an isometric view of a portable electronic device according to an embodiment of this invention.

Referring to FIG. 6, an alternate embodiment of the present invention is shown in an isometric view of bottom portion 608 of case 602. In this embodiment, port tube 640 is formed in acoustic insulator 632 such that acoustic insulator 632 does not completely encircle first aperture 630, thus creating ported external chamber 634. The structure inside case 602 is substantially similar as that of the embodiment shown in FIGS. 4 and 5. Back chamber 558 (as shown in FIG. 5) and external chamber 634, in this embodiment, provides acoustical compliance for sound from back portion 554 (see FIG. 5) of speaker 650 (not shown), whereas port tube 640 provides an acoustic mass for sound from back portion 554 (FIG. 5) of speaker 650. The combination of the air mass of port tube 640 and the compliance of back chamber 558 and external chamber 634 is tuned with speaker 650 to provide an optimum speaker system. Both the dimension as well as the shape of port tube 640, back chamber 558, and external chamber 634 can all be varied to provide an optimum speaker system. Thus, in this configuration, sound emanating from port tube 640 and sound chamber 566 (FIG. 5) is substantially in phase. In this embodiment, the addition of port tube 640 functions as a dual chamber vented/vented band pass system with higher order filtering.

The design of ported speaker enclosures is highly dependent on both the resonant frequency and the equivalent acoustic compliance of the speaker used. For a more detailed description of portable electronic devices having a ported speaker chamber design, see U.S. Pat. No. 5,610,992. The ability to use a ported speaker structure improves both the low frequency response as well as increasing the maximum power that can be supplied to speaker 650. Typically, improvements of a factor of four to nine are obtained depending on both the speaker used and the volume available for the various chambers. This boost in performance allows portable electronic device 100 to be much more useful in sound-important applications, such as multimedia applications.

Those skilled in the art will appreciate that port tube 640 can also be formed in case 602. For example, the embodiment shown in FIG. 6 could have port tube 640 formed in either top portion 606 or front side 612. For the embodiment shown in FIGS. 1–3 the port tube 640 could be formed in top portion 106, right side 104, front side 112 or bottom portion 108. Those skilled in the art will also appreciate that portable electronic device 100 can contain multiple speakers and that multiple speakers in various combinations of closed and ported structures described above can be utilized.

Figure 7:
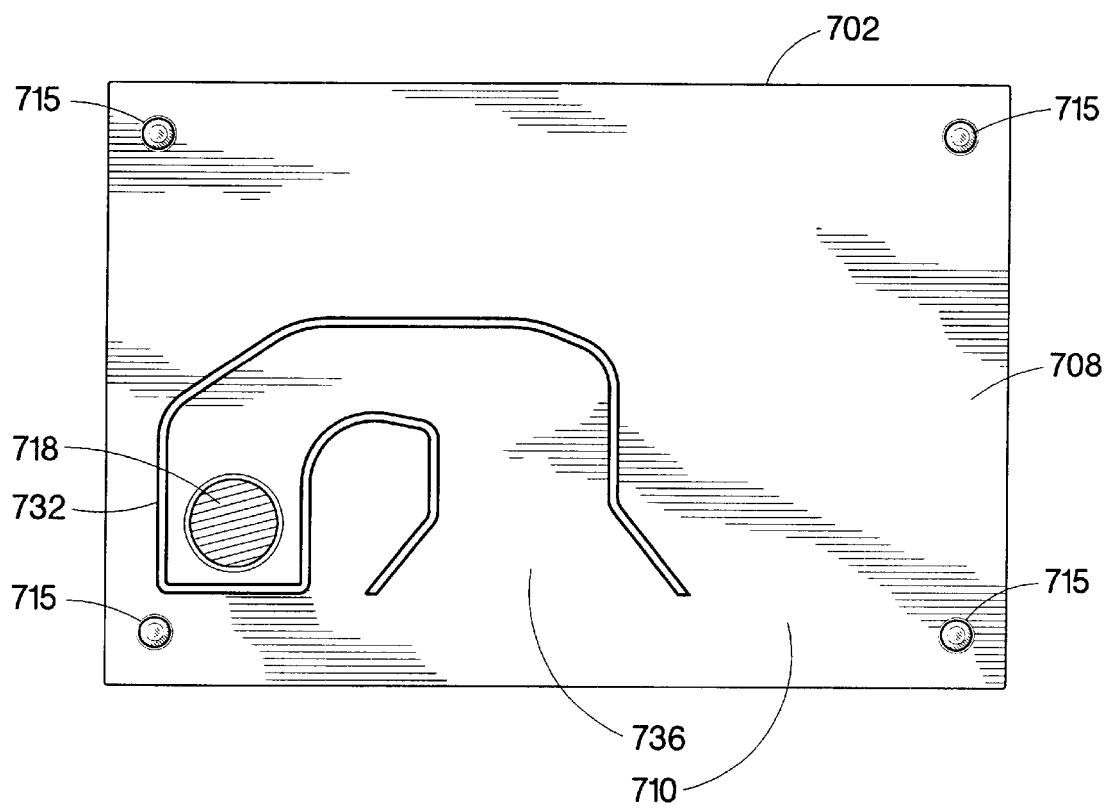
FIG. 7 is a top view of a portable electronic device according to an embodiment of this invention.

Referring to FIG. 7, an alternate embodiment of the present invention is shown as a top view of the bottom portion 708 of case 702. In this embodiment acoustic insulator 732 is attached to base surface 710 of case 702. Acoustic insulator 732 in this embodiment forms acoustic horn 736 around speaker grill 718. The acoustic horn acts as an acoustic impedance matching device where the impedance is matched between the opening of the horn and the drive element of speaker 750 (not shown). The horn contours can be chosen, using a variety of different algorithms readily known to those skilled in the art, to provide optimum impedance matching characteristics. The use of an acoustic horn in this embodiment allows a different set of size and weight tradeoffs in design. In addition, those skilled in the art will appreciate that the two footings 715 closest to front side 712 can be higher than the two footings 715 closest to back side 714 thereby creating a three dimensional acoustic horn. In this embodiment, acoustic insulator 732 must also vary in height to substantially match the change in height of footings 715.

Figure 8A:
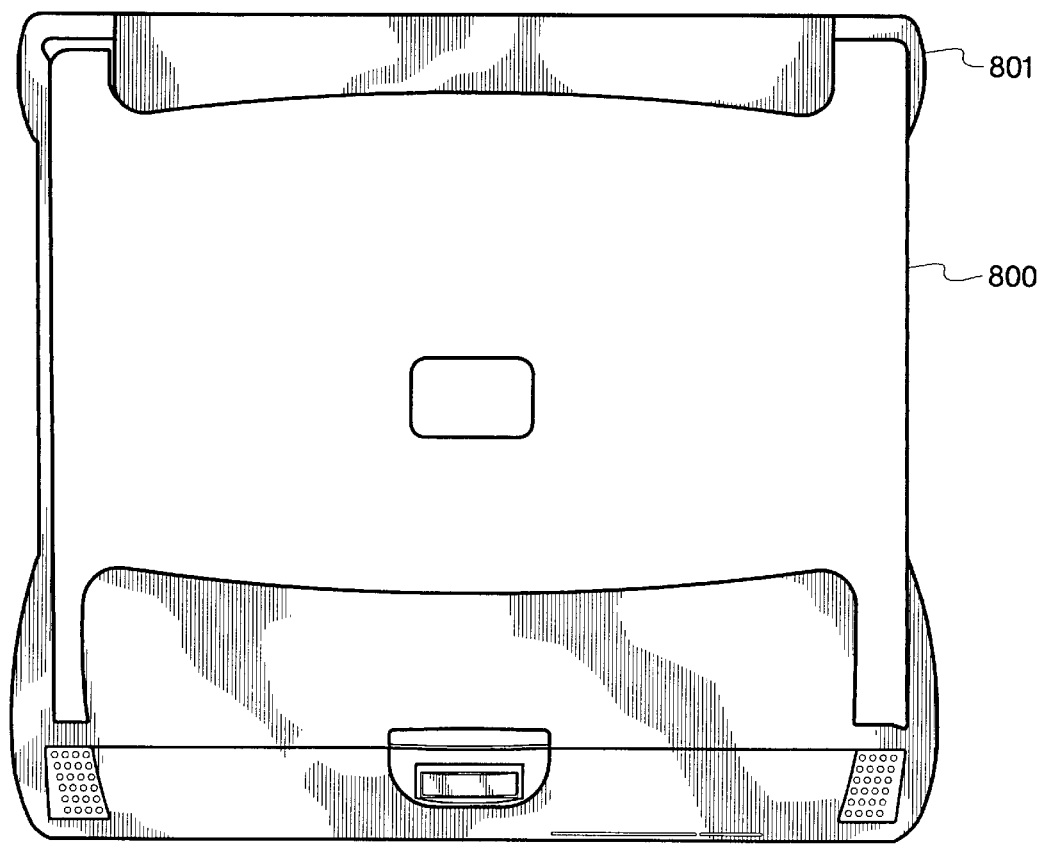
FIG. 8a is a top view of a portable electronic device according to an embodiment of this invention.
Figure 8B:
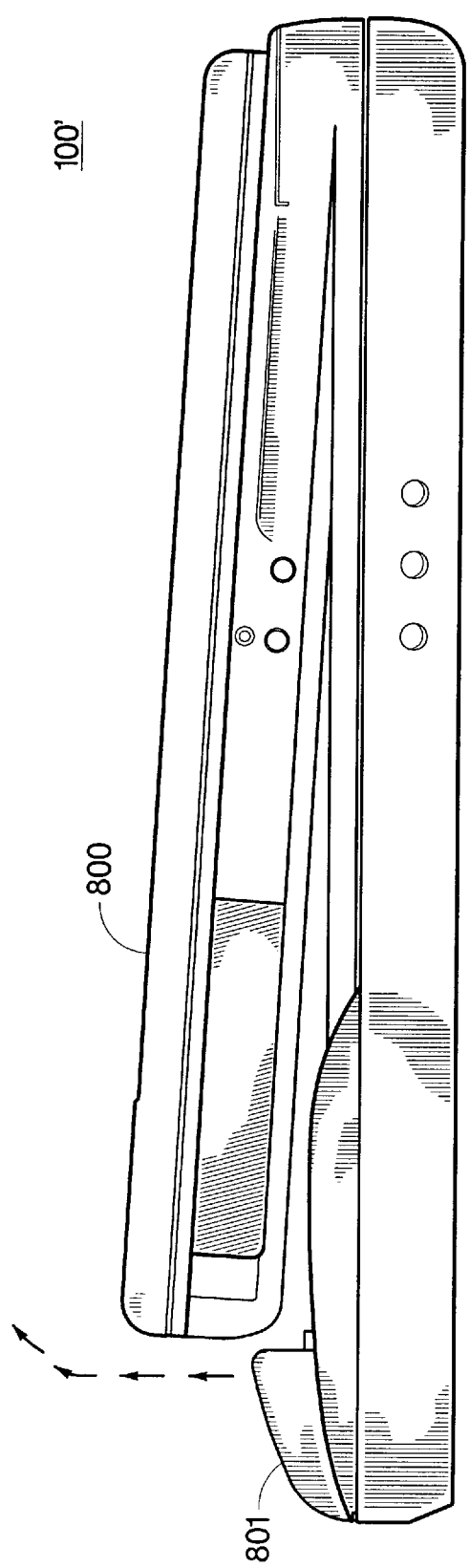
FIG. 8b is a plan view of a portable electronic device according to an embodiment of this invention.
Figure 8C:
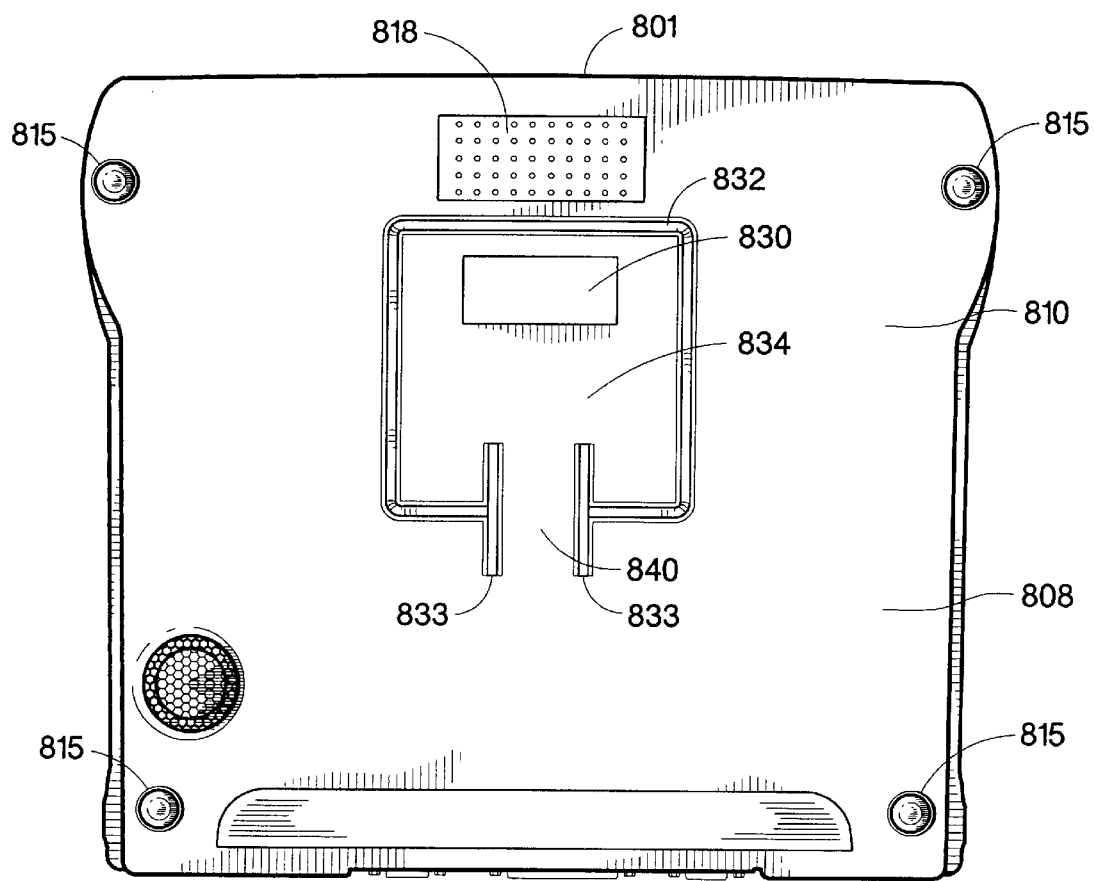
FIG. 8c is a top view of a portable electronic device according to an embodiment of this invention.

Those skilled in the art will also appreciate that all of the embodiments described above can also be utilized in a portable computer docking station to provide improved sound quality while using minimum space. An example of such a system is one in which portable electronic device 100' includes notebook computer 800 and portable docking station 801 which is shown in FIG. 8*a* in top view and in FIG. 8*b* in side view showing notebook computer 800 being removed from portable docking station 801. A top view of base surface 810 of portable docking station 801 is shown in FIG. 8*c*. In this embodiment port tube 840 is formed in acoustic insulator 832 such that acoustic insulator 832 does not completely encircle first aperture 830 which is disposed through bottom portion 808 of case 801, thus creating ported external chamber 834. Acoustic insulator 832 and footings 815 are attached to base surface 810. Speaker grill 818 is also disposed through bottom portion 808 of case 801. Those skilled in the art will readily recognize that multiple speakers with various combinations of closed, ported, and horned structures as previously discussed can all be built into the docking station. In addition those skilled in the art will also appreciate that notebook computer 800 as well as portable docking station 801 both can utilize the same or different combinations of the embodiments as described in the present invention.

What is claimed is:

1. A portable electronic device comprising:
   a case having a top portion and a bottom portion having a base surface;
   a speaker disposed inside the case, having a front portion and a back portion;
   wherein a back chamber is formed in association with the back portion of the speaker; and
   a first aperture disposed through the bottom portion of the case;
   an acoustic insulator attached to the base surface of the case;
   wherein the acoustic insulator encircles the first aperture and an external chamber is defined at least by the base surface, and the acoustic insulator being adapted to rest upon a support surface upon which the portable electronic device rests; wherein the external chamber is coupled to the back chamber by the first aperture.

2. The portable electronic device of claim 1, further comprising a port tube disposed on the case coupled to the back chamber, wherein sound is emitted from the back chamber through the port tube.

3. The portable electronic device of claim 1, further comprising a plurality of the speakers disposed inside the case.

4. The portable electronic device of claim 1, further comprising a
   a support disposed within the case, having a wall substantially encircling the front portion of the speaker; and
   a speaker grill defined in the bottom portion at the base portion of the case;
   wherein the support within the case is located in proximity to the speaker grill for supporting the speaker between the top portion and bottom portion of the case, with the speaker oriented toward the speaker grill, and a front chamber is formed in association with the front portion of the speaker.

5. The portable electronic device of claim 4, wherein the front chamber is defined by the wall, the speaker grill and front portion of the speaker and the support acoustically decouples the front chamber from the back chamber.

6. The portable electronic device of claim 5, wherein the case further comprises:
   a left side, a right side, a front side, and a back side, wherein a sound chamber is defined at least by the base surface, the left side, the right side, the front side, and the back side of the case, excluding the area bounded by the acoustic insulator and the support surface upon which the portable electronic device rests.

7. The portable electronic device of claim 1, wherein the back chamber and external chamber form a combined volume, where the combined volume is determined from the resonant frequency of the speaker and the equivalent acoustic compliance of the speaker.

8. The portable electronic device of claim 1, wherein the acoustic insulator further comprises a geometric shape which is configured to optimize the frequency range of the speaker.

9. The portable electronic device of claim 1, further comprising foam seals between the speaker and the support for acoustically isolating sound waves from the front chamber from sound waves at the back chamber.

10. The portable electronic device of claim 1, further comprising an audio level control having an audio level adjustment wherein the audio level control has a first volume state and a second volume state.

11. The portable electronic device of claim 1, wherein the portable electronic device is a portable computer.

12. The portable electronic device of claim 1, wherein the portable electronic device is a personal digital assistant.

13. A portable electronic device comprising:
   a case having a top portion and a bottom portion having a base surface;
   a speaker disposed inside the case, having a front portion and a back portion;

wherein a back chamber is formed in association with the back portion of the speaker; and an acoustic insulator attached to the base surface of the case;

wherein the acoustic insulator substantially encircles the front portion of the speaker on three sides and an acoustic horn is defined at least by the base surface, and the acoustic insulator being adapted to rest upon a support surface upon which the portable electronic device rests.

14. The portable electronic device of claim 13, wherein the case further comprises footings which vary in height in a predetermined manner and the acoustic insulator smoothly varies in height to substantially match the height of the footings.

15. A method for transmitting sound from a portable electronic device, comprising the steps of:

generating acoustic energy from a speaker by way of a vibrating member;

transmitting a first portion of the acoustic energy from the vibrating member through a speaker grill located in proximity to the vibrating member;

coupling a second portion of the acoustic energy from a rear surface of the vibrating member through an aperture on a surface to an external chamber formed by the surface, a supporting surface on which the portable electronic device rests, and an acoustic insulator which encircles the aperture and separates the surface from the supporting surface on which the portable electronic device rests.

16. The method of claim 15, further comprising the step of transmitting sound from a port tube.

17. A method of manufacturing an external chamber for a speaker in a portable electronic device, comprising the steps of:

mounting a speaker in a case forming a back chamber around a back portion of the speaker forming an aperture in a base surface of a case where the aperture is coupled to the back chamber; and attaching an acoustic insulator to the base surface of the case which encircles the aperture forming an external chamber where the external chamber is acoustically coupled to the back chamber through the aperture.

18. The apparatus manufactured in accordance with the steps of claim 17.

19. A system, comprising:

a portable electronic device;

a docking station;

wherein the docking station comprises:

a case having, a top portion and a bottom portion having a base surface;

a speaker having a front portion and a back portion;

wherein a back chamber is formed in association with the back portion of the speaker; and a first aperture disposed through the bottom portion of the case;

an acoustic insulator attached to the base surface of the case;

wherein the acoustic insulator encircles the first aperture and an external chamber is defined at least by the base surface, and an acoustic insulator being adapted to rest upon a support surface upon which the portable electronic device rests; wherein the external chamber is coupled to the back chamber by the first aperture.

20. A portable electronic device comprising:

a case having a top portion, a bottom portion, and side portions connecting the top portion and the bottom portion;

wherein the bottom portion defines a speaker grill at a base surface of the case;

a speaker having a front portion and a back portion;

a support having an internal surface and an external surface located in proximity to the speaker grill within the case for supporting the speaker between the top portion and bottom portion of the case with the speaker oriented downward toward the speaker-grill, and the support acoustically isolates the front portion of the speaker from the back portion of the speaker;

a front internal speaker-chamber is defined by the base surface and the internal surface of the support and the front portion of the speaker;

wherein a back speaker-chamber is defined by the top portion and the external surface of the support and the back portion of the speaker;

a first aperture disposed on an exterior surface of the case to allow sound to be emitted from the back portion of the speaker;

a port tube disposed on the base surface; and an acoustic insulator attached to the bottom surface of the case;

wherein the acoustic insulator is formed around the port tube to form an external chamber coupled to the back speaker chamber by the port tube.

\* \* \* \* \*